United States Patent
Kunieda (10) Patent No.: US 7,846,526 B2
(45) Date of Patent: *Dec. 7, 2010

(54) HONEYCOMB STRUCTURAL BODY AND SEALING MATERIAL LAYER

(75) Inventor: Masafumi Kunieda, Gifu (JP)

(73) Assignee: Ibiden Co., Ltd, Gifu (JP)

( * ) Notice: Subject to any disclaimer, the term of this patent is extended or adjusted under 35 U.S.C. 154(b) by 872 days.

This patent is subject to a terminal disclaimer.

(21) Appl. No.: 11/317,199

(22) Filed: Dec. 27, 2005

(65) Prior Publication Data

US 2006/0177629 A1    Aug. 10, 2006

(30) Foreign Application Priority Data

Dec. 27, 2004  (JP) .............................. 2004-375816
Nov. 14, 2005  (WO) ................. PCT/JP2005/021188

(51) Int. Cl.
  *B32B 3/12* (2006.01)
  *B32B 3/26* (2006.01)
  *B29C 65/00* (2006.01)
  *C04B 35/10* (2006.01)
  *C04B 35/00* (2006.01)

(52) U.S. Cl. ...................... 428/116; 428/188; 428/34.5; 428/304.4; 156/60; 156/89.11; 501/118; 501/153

(58) Field of Classification Search ........................ None
See application file for complete search history.

(56) References Cited

U.S. PATENT DOCUMENTS

| | | | | |
|---|---|---|---|---|
| 4,448,833 A | * | 5/1984 | Yamaguchi et al. ......... | 428/116 |
| 4,808,460 A | * | 2/1989 | Chyung et al. .............. | 428/116 |
| 5,316,710 A | * | 5/1994 | Tasaki et al. ................ | 264/630 |
| 5,508,081 A | * | 4/1996 | Inagaki et al. .............. | 428/116 |
| 6,365,259 B1 | * | 4/2002 | Brundage et al. ........... | 428/116 |
| 7,182,999 B2 | | 2/2007 | Ohashi et al. | |
| 7,625,529 B2 | * | 12/2009 | Ohno et al. ................. | 422/180 |
| 2002/0197193 A1 | * | 12/2002 | Harada et al. ............... | 422/177 |
| 2004/0093858 A1 | * | 5/2004 | Aoki ........................... | 60/299 |
| 2004/0118095 A1 | * | 6/2004 | Chikawa et al. ............ | 55/523 |
| 2005/0016140 A1 | * | 1/2005 | Komori et al. .............. | 55/523 |
| 2005/0016141 A1 | | 1/2005 | Hong et al. | |
| 2005/0102984 A1 | | 5/2005 | Bardon et al. | |

(Continued)

FOREIGN PATENT DOCUMENTS

DE    43 41 159 A1    6/1995

(Continued)

OTHER PUBLICATIONS

JP 2003-128473 Human Translation.*

(Continued)

*Primary Examiner*—David R Sample
*Assistant Examiner*—Nicole T Gugliotta
(74) *Attorney, Agent, or Firm*—Finnegan, Henderson, Farabow, Garrett and Dunner, LLP (57) ABSTRACT

The honeycomb structural body comprises pillar-shaped honeycomb structural porous ceramic members formed by arranging a plurality of cells through cell walls, and a sealing material layer interposed between the ceramic members and having a specific surface area of approximately 10 to 100 $m^2/g$, and the honeycomb structural body is constructed by bonding a plurality of porous ceramic members through sealing material layer as an exhaust gas convertion apparatus.

26 Claims, 3 Drawing Sheets

U.S. PATENT DOCUMENTS

| | | |
|---|---|---|
| 2005/0102987 A1 | 5/2005 | Kudo |
| 2005/0153099 A1* | 7/2005 | Yamada .................... 428/117 |
| 2005/0227869 A1* | 10/2005 | Ohno et al. ................ 502/439 |
| 2005/0266992 A1* | 12/2005 | Ohno et al. ................ 502/439 |
| 2006/0172113 A1 | 8/2006 | Kunieda |
| 2006/0263574 A1 | 11/2006 | Tsunekawa et al. |
| 2006/0292044 A1 | 12/2006 | Ohno et al. |
| 2006/0292330 A1 | 12/2006 | Ohno et al. |
| 2006/0292331 A1 | 12/2006 | Ohno et al. |
| 2006/0292332 A1 | 12/2006 | Ohno et al. |
| 2006/0292333 A1 | 12/2006 | Ohno et al. |
| 2006/0292334 A1 | 12/2006 | Ohno et al. |
| 2006/0292335 A1 | 12/2006 | Ohno et al. |
| 2006/0292336 A1 | 12/2006 | Ohno et al. |
| 2006/0292337 A1 | 12/2006 | Ohno et al. |
| 2006/0292338 A1 | 12/2006 | Ohno et al. |
| 2006/0292339 A1 | 12/2006 | Ohno et al. |
| 2006/0292340 A1 | 12/2006 | Ohno et al. |
| 2006/0292341 A1 | 12/2006 | Ohno et al. |
| 2006/0292342 A1 | 12/2006 | Ohno et al. |
| 2006/0292393 A1 | 12/2006 | Kunieda |
| 2007/0004592 A1 | 1/2007 | Ohno et al. |
| 2007/0004593 A1 | 1/2007 | Ohno et al. |
| 2007/0039295 A1 | 2/2007 | Ohno |
| 2007/0077190 A1 | 4/2007 | Ohno |
| 2008/0118701 A1 | 5/2008 | Ohno et al. |
| 2008/0119355 A1 | 5/2008 | Ohno et al. |
| 2008/0176028 A1 | 7/2008 | Ohno et al. |
| 2008/0187713 A1 | 8/2008 | Ohno et al. |
| 2008/0241003 A1 | 10/2008 | Ido et al. |
| 2008/0241005 A1 | 10/2008 | Ido et al. |
| 2008/0241008 A1 | 10/2008 | Ido et al. |
| 2008/0260991 A1 | 10/2008 | Konstandopoulos et al. |
| 2009/0202779 A1 | 8/2009 | Yoshida |
| 2009/0239744 A1 | 9/2009 | Ohno et al. |
| 2009/0246099 A1 | 10/2009 | Ohno et al. |
| 2009/0247395 A1 | 10/2009 | Kunieda et al. |

FOREIGN PATENT DOCUMENTS

| | | |
|---|---|---|
| EP | 0 816 065 A1 | 1/1998 |
| EP | 1 447 535 A1 | 8/2004 |
| EP | 1 452 511 A1 | 9/2004 |
| EP | 1 479 881 A1 | 11/2004 |
| EP | 1 489 277 A1 | 12/2004 |
| EP | 1 493 479 A1 | 1/2005 |
| EP | 1 495 791 A1 | 1/2005 |
| EP | 1 698 604 A1 | 9/2006 |
| JP | 10-263416 | 10/1988 |
| JP | 05-213681 | 8/1993 |
| JP | 5-213681 | 8/1993 |
| JP | 2000102709 * | 4/2000 |
| JP | 2000-279729 | 10/2000 |
| JP | 2002-161726 | 6/2002 |
| JP | 2003-128473 * | 5/2003 |
| JP | 2003-245547 | 9/2003 |
| JP | 2004-154718 | 6/2004 |
| JP | 2004-322095 | 11/2004 |
| WO | WO 03/053542 A1 | 7/2003 |
| WO | WO 03/067041 A1 | 8/2003 |
| WO | WO 03/078026 A1 | 9/2003 |
| WO | WO 03/081001 A1 | 10/2003 |
| WO | WO 03/086579 | 10/2003 |
| WO | WO 03/086579 A1 | 10/2003 |
| WO | WO 2004/024295 * | 3/2004 |
| WO | WO 2004/024295 A1 | 3/2004 |
| WO | WO 2004/031100 A1 | 4/2004 |
| WO | WO 2006/025283 A1 | 3/2006 |
| WO | WO 2006/040874 A1 | 4/2006 |
| WO | WO 2006/137149 A1 | 12/2006 |
| WO | WO 2006/137150 A1 | 12/2006 |
| WO | WO 2006/137151 A1 | 12/2006 |
| WO | WO 2006/137155 A1 | 12/2006 |
| WO | WO 2006/137156 A1 | 12/2006 |
| WO | WO 2006/137157 A1 | 12/2006 |
| WO | WO 2006/137158 A1 | 12/2006 |
| WO | WO 2006/137159 A1 | 12/2006 |
| WO | WO 2006/137160 A1 | 12/2006 |
| WO | WO 2006/137161 A1 | 12/2006 |
| WO | WO 2006/137162 A1 | 12/2006 |
| WO | WO 2006/137163 A1 | 12/2006 |
| WO | WO 2006/137164 A1 | 12/2006 |
| WO | WO 2007/000825 A1 | 1/2007 |
| WO | WO 2007/000826 A1 | 1/2007 |

OTHER PUBLICATIONS

Japanese Standards Association, JIS-R-1626, Japanese Industrial Standard, "Measuring methods for the specific surface area of fine ceramic powders by gas adsorption using the BET method", pp. 1-18, (1996).

Japanese Standards Association, JIS-B-0601, Japanese Industrial Standard "Geometrical Product Specifications (GPS)-Surface texture: Profile Method-Terms, definitions and surface texture parameters", pp. 1-27, (2001).

European Search Report dated Jan. 10, 2007 for divisional application No. 07006231 from the European application No. 05292794.4.

International Search Report mailed Jan. 10, 2006 of International Application No. PCT/JP2005/021188.

PCT Notification of Transmittal of Translation of the International Preliminary Report on Patentability for PCT/JP2005/021188 dated Jul. 3, 2007.

PCT Notification Concerning Transmittal of International Preliminary Report on Patentability for PCT/JP2005/021188 dated Jul. 3, 2007.

Chinese Second Office Action dated May 8, 2009 (5 pgs.) application No. 2005800017001, with English translation 6 pgs.

European Search Report dated May 31, 2006.

Kunieda et al., U.S. Appl. No. 12/194,888, filed Aug. 20, 2008.
Ohno et al., U.S. Appl. No. 12/238,057, filed Sep. 25, 2008.
Miwa et al., U.S. Appl. No. 12/245,821, filed Oct. 6, 2008.
Ohno et al., U.S. Appl. No. 12/246,899, filed Oct. 7, 2008.
Kunieda et al., U.S. Appl. No. 12/246,881, filed Oct. 7, 2008.
Ido et al., U.S. Appl. No. 12/239,342, filed Sep. 26, 2008.
Ido et al. U.S. Appl. No. 12/246,913, filed Oct. 7, 2008.
Kunieda et al., U.S. Appl. No. 12/246,869, filed Oct. 7, 2008.
Ido et al., U.S. Appl. No. 12/248,647, filed Oct. 9, 2008.
Fujita et al., U.S. Appl. No. 12/248,675, filed Oct. 9, 2008.
Ido et al., U.S. Appl. No. 11/925,394, filed Oct. 26, 2007.
Ido, U.S. Appl. No. 11/853,658, filed Sep. 11, 2007.
Ohno et al., U.S. Appl. No. 11/928,546, filed Oct. 30, 2007.
Ogura et al., U.S. Appl. No. 12/516,813, filed May 29, 2009.
Kunieda et al., U.S. Appl. No. 12/368,514, filed Feb. 10, 2009.
Ohno et al., U.S. Appl. No. 12/346,628, filed Dec. 30, 2008.
Kunieda et al., U.S. Appl. No. 12/346,610, filed Dec. 30, 2008.
Ohno et al., U.S. Appl. No. 12/367,780, filed Feb. 9, 2009.
Ohno et al., U.S. Appl. No. 12/389,338, filed Feb. 19, 2009.
Ohno et al., U.S. Appl. No. 12/358,937, filed Jan. 23, 2009.
Ohno et al., U.S. Appl. No. 12/389,343, filed Feb. 19, 2009.
Ohno et al., U.S. Appl. No. 12/359,957, filed Jan. 26, 2009.
Ohno et al., U.S. Appl. No. 12/343,965, filed Dec. 24, 2008.
Ohno et al., U.S. Appl. No. 12/359,969, filed Jan. 26, 2009.
Ohno et al., U.S. Appl. No. 12/369,347, filed Feb. 11, 2009.
Ohno et al., U.S. Appl. No. 12/372,192, filed Feb. 17, 2009.
Ohno et al., U.S. Appl. No. 12/372,229, filed Feb. 17, 2009.
Ohno et al., U.S. Appl. No. 12/368,551, filed Feb. 10, 2009.
Ohno et al., U.S. Appl. No. 12/362,310, filed Jan. 29, 2009.
Ohno et al., U.S. Appl. No. 12/355,999, filed Jan. 19, 2009.
Ohno et al., U.S. Appl. No. 12/355,990, filed Jan. 19, 2009.

* cited by examiner

Cross-sectional view taken along the A-A line

HONEYCOMB STRUCTURAL BODY AND SEALING MATERIAL LAYER

RELATED APPLICATION

This application is an application claiming priority rights based on Japanese Patent Application No. 2004-375816 filed on Dec. 27, 2004 and PCT Application No. PCT/JP2005/021188 filed on Nov. 14, 2005.

The contents of the applications are incorporated herein by reference in their entirety.

TECHNICAL FIELD

This invention relates to a honeycomb structural body and a sealing material layer, and more particularly to a honeycomb structural body suitable for use in an exhaust gas converting apparatus and a sealing material layer used for bonding porous ceramic members constituting the structural body with each other.

BACKGROUND ART

As the honeycomb structural body used in the exhaust gas converting apparatus for vehicles, there is well known a one-piece type honeycomb structure (called as a honeycomb monolith) made of a low thermal expansive cordierite. This type of the honeycomb structural body is used by carrying a material having a high specific surface area such as active alumina or the like, a catalyst of a noble metal such as platinum or the like, and an alkali metal for the NOx purifying treatment on the wall surface.

As another example of the honeycomb structural body, there is also known an aggregate type honeycomb structural body formed by integrally bonding a plurality of honeycomb structural units (honeycomb units) made of a high specific surface area material prepared by extrusion molding a material comprising inorganic fibers and an inorganic binder through adhesion sealing materials (DE 4341159 A1).

Also, there is known a honeycomb structural body used as an exhaust gas converting filter for catching and oxidation removing particulates included in the exhaust gas from vehicles (WO03/067041 A1, WO03/081001 A1).

The contents of DE 4341159 A1, WO03/067041 A1 and WO03/081001 A1 are incorporated herein by reference in their entirety.

DISCLOSURE OF THE INVENTION

A first aspect of the invention lies in a honeycomb structural body comprising pillar-shaped honeycomb structural porous ceramic members formed by arranging a plurality of cells side by side through cell walls and a sealing material layer interposed between the mutual ceramic members for bonding a plurality of the porous ceramic members in the presence of the sealing material layer, characterized in that the sealing material layer has a specific surface area of approximately 10 to 100 m²/g.

In the honeycomb structural body according to the invention, it is preferable that an outermost peripheral portion of a honeycomb block formed by bonding the plurality of the ceramic members is covered with a sealing material layer having the same as the above sealing layer material; and that the surface (cell wall) of the ceramic members contacting with the sealing material layer has a surface roughness Ra of approximately 1.0 to 30 μm; and that the sealing material layer has an adhesion action and comprises an inorganic binder and inorganic particles and/or inorganic fibers; and that a main component of the ceramic member is alumina; and that the honeycomb structural body is used as an exhaust gas converting apparatus for vehicles.

A second aspect of the invention lies in a sealing material layer filling in a gap between the porous honeycomb units characterized by having a specific surface area of approximately 10 to 100 m²/g.

It is preferable that the sealing material layer is used for bonding pillar-shaped honeycomb structural porous ceramic members formed by arranging a plurality of cells. side by side through cell walls with each other, or as a coating for covering an outermost peripheral portion of the pillar-shaped honeycomb structural porous ceramic members formed by arranging a plurality of the cells side by side through the cell walls, and comprises an inorganic binder and inorganic particles and/or inorganic fibers and has a sheet-like form.

BEST MODE FOR CARRYING OUT THE INVENTION

The inventors have made various experiments on the sealing material used in the honeycomb structural body, particularly focusing on the specific surface area when it is shaped into a layer having a certain thickness or into a sheet-like form. In these experiments, the inventors have found that the sealing property is gradually improved as the specific surface area of the sealing material is made large. However, the inventors also have found an unexpected fact that when the specific surface area is made larger to exceed a certain limit, the adhesiveness is rather deteriorated.

The feature of the invention is discovered from the experiments and lies in that the specific surface area of the sealing material layer is limited to approximately 10 to 100 m²/g. With such a sealing material layer, it is elucidated that the sealing property and adhesiveness of the honeycomb structural body are improved. That is, it has been found that when the specific surface area of the sealing material layer is approximately 10 to 100 m²/g, cracks due to the thermal shock hardly occur and the bonding strength is increased to enhance the adhesiveness.

The reason for such a result is considered as follows. That is, when the specific surface area of the sealing material layer is within the range of approximately 10 to 100 m²/g, pores undesirable as a sealing material are not generated or irregularities are not generated on the surface of the sealing material layer (boundary face to the surface of the honeycomb structural body). As a result, when the thermal shock is applied to the sealing material, it is considered that cracks hardly occur in the sealing material layer to improve the bonding property.

It is considered that the sealing material layer having the specific surface area of the above range can strongly bond the honeycomb units with each other, and even if the thermal shock or the like is applied, cracks are hardly generated between the sealing material layer and the honeycomb units, so that the sealing property is further improved.

Moreover, the value of the specific surface area is represented by BET specific surface area ($m^2/g$) per unit weight of the sealing material and measured by a one-point method according to JIS-R-1626 (1996) prescribed by the Japanese Industrial Standards.

The specific surface area of the sealing material layer can be controlled by adjusting the amount or kind of particles made of an oxide ceramic having a large specific surface area, or by adjusting the particle size of the starting material and the like. For example, it can be controlled by adding an oxide having a high specific surface area such as alumina, zirconia, silica or the like. Also, the specific surface area can be adjusted by changing the firing temperature and firing time of the sealing material.

In the invention, it is desirable to not only limit the composition of the sealing material layer, but also adjust the surface roughness Ra (according to JIS-B-0601 (2001)) of the member contacting with the sealing material layer, that is, the honeycomb structural body (including the honeycomb units), to approximately 1 to 30 μm.

When the surface roughness of the honeycomb structural body is within the above range, it is considered that the irregularities on the sealing material layer and the surface layer of the honeycomb structural body engage with each other to provide a high anchoring effect and hence the sealing property is further improved.

Here, the surface of the honeycomb structural body contacting with the surface of the sealing material layer means, for example, an outer peripheral surface of the porous ceramic member (honeycomb unit), or the outer wall surface of the outermost peripheral portion in the honeycomb block.

As mentioned above, the invention uses a material having a specific surface area of approximately 10 to 100 $m^2/g$ when being shaped, for example, into a sheet as a sealing material layer existing in the gap between the porous ceramic members (honeycomb units) or covering the outermost peripheral portion thereof, so that cracks and the like due to the thermal shock hardly occur, and in particular, when it is used under a circumstance easily subjected to the thermal shock as in a filter for the exhaust gas convertion, it can expect effects of developing high sealing property and adhesiveness and maintaining an excellent durability for a long time.

The contents of JIS-R-1629(1996) and JIS-B-0601(2001) are incorporated herein by reference in their entirety.

Hereinafter, preferred embodiments of the honeycomb structural body according to the invention will be described.

The honeycomb structural body is constructed by using units (honeycomb units) in which one unit is the pillar-shaped porous ceramic member comprising a plurality of cells arranged side by side in the longitudinal direction through cell walls.

Also, the honeycomb structural body comprises a sealing material layer also functioning as an adhesive for bonding the honeycomb units with each other, and a sealing material layer functioning as a sealing material for the outer peripheral wall of the honeycomb structural body in addition to the honeycomb units.

Figure 1:
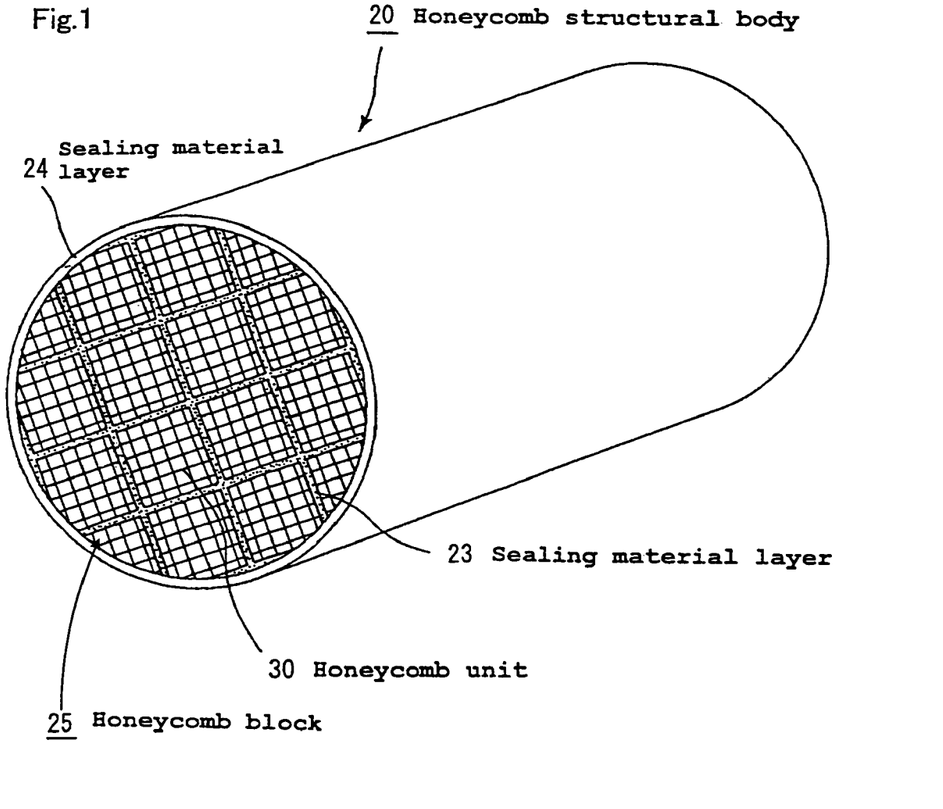
FIG. 1 is a perspective view of an aggregate type honeycomb structural body according to the invention.

FIG. 1 is a perspective view schematically showing an example of the honeycomb structural body, and FIG. 2(a) is a perspective view schematically showing an example of the porous ceramic member (honeycomb unit) constituting the honeycomb structural body shown in FIG. 1. The honeycomb unit 30 has a plurality of cells (through-holes) 31 from this side to further side and the cells 31 are arranged side by side through cell walls 33 to form the honeycomb structural body. The honeycomb unit is not particularly limited, but it is preferable to have a shape easy to bond the honeycomb units with each other. For example, the cross section of the surface perpendicular to the through-hole (hereinafter referred as "unit cross section") is preferable to be polygonal such as square, rectangular, pentagonal or hexagonal. Further, it may have a fan-shape cross section.

The honeycomb structural body 20 constitutes a honeycomb block 25 formed by bundling a plurality of honeycomb units 30 through a sealing material layer (adhesive layer) 23. Preferably, a sealing material layer (coating layer) 24 is formed between the outer peripheral wall of the honeycomb block 25 and a casing and used for preventing the exhaust gas leak or giving strength. The honeycomb structural body having such a construction can enhance the strength against the thermal shock or vibration as a whole even if the mechanical strength, thermal shock resistance and the like of each honeycomb unit is low. As a result, in the honeycomb structural body according to the invention, it is possible to use a material having a high specific surface area as a material constituting the cell walls or porosity thereof, and therefore, catalyst components can be widely dispersed and carried on such a cell wall.

The reason that the honeycomb structural body shows good properties to the thermal shock or vibration is considered due to the fact that even if a temperature distribution is caused in the structural body due to a rapid temperature change or the like, the thermal shock and vibration are mitigated owing to the small temperature difference of each honeycomb unit and the presence of the sealing material layer. Moreover, even if cracks are generated in the honeycomb units due to the thermal stress or the like, the sealing material layer plays a role for preventing the cracks extending to the whole honeycomb structural body and also for protecting the honeycomb structural body. Consequently, by adopting such a sealing material layer, the shape of the honeycomb structural body is maintained stably for a long time, and the durability is improved and in addition, the function as a filter or catalyst carrier is maintained for a long time.

As the size of the porous ceramic member (honeycomb unit) as a constitutional unit of the honeycomb structural body, the unit cross sectional area of the face perpendicular to the cell is preferably approximately 5-50 $cm^2$, more preferably approximately 6-40 $cm^2$, and further preferably approximately 8-30 $cm^2$.

When the sectional area is within a range of approximately 5 to 50 $cm^2$, the shape as a honeycomb structural body can be maintained over a long time and the dispersibility of the catalyst component can be enhanced even if an external force such as the thermal shock or vibration is applied thereto. That is, when the cross sectional area is approximately 5 $cm^2$ or more, the cross sectional area of the sealing material layer bonding a plurality of honeycomb structural bodies becomes small, so that the sum of the unit cross sectional areas becomes relatively large and the pressure loss is not increased, and also the specific surface area carrying the catalyst becomes relatively large as a whole of the honeycomb structural body. On the other hand, when the cross sectional area is approximately 50 $cm^2$ or less, the honeycomb structural body does not overgrow to easily restrain the thermal stress generated in each honeycomb structural body.

By limiting the cross sectional area of the honeycomb unit to approximately 5-50 $cm^2$, the pressure loss can be suppressed small while keeping a large specific surface area as a whole of the honeycomb structural body, and the honeycomb structural body shows a strength enough to withstand the thermal stress and an excellent durability. That is, in the honeycomb structural body according to the invention, it is possible to increase the strength against the thermal shock or vibration and the dispersibility of the catalyst components.

Moreover, when the honeycomb structural body contains plural honeycomb units having different sectional areas, the cross sectional area of the honeycomb unit means a largest cross sectional area of a basic honeycomb unit.

Further, a ratio of the total cross sectional area of the honeycomb units to the whole cross sectional area of the honeycomb structural body is preferably approximately 85% or more, and more preferably approximately 90% or more. When the ratio is approximately 85% or more, the area of the sealing material layer becomes relatively small and the cross sectional area of the honeycomb unit portions is increased, so that the area carrying the catalyst becomes relatively large and the pressure loss is not increased. When the ratio is approximately 90% or more, the pressure loss can be further decreased.

The shape of the pillar-shaped honeycomb structural body obtained by bonding a plurality of the honeycomb units is not particularly limited, but it is considered to be, for example, cylindrical-shaped as shown in FIG. 1, prismatic-shaped, elliptic cylinder-shaped or the like.

The above honeycomb structural body may be a porous ceramic member (honeycomb unit) prepared by mixing an inorganic material of a first embodiment (inorganic material having a large specific surface area) with a different kind of inorganic material of a second embodiment to be hereinafter described (hereinafter referred to as "high specific surface area honeycomb unit").

The high specific surface area honeycomb unit is preferable to include at least ceramic particles having a large specific surface area and an inorganic binder, or to include ceramic particles having a large specific surface area, an inorganic reinforcing agent and an inorganic binder.

As described above, the high specific surface area honeycomb unit is constructed by using the ceramic particles having a high specific surface area as an inorganic material, so that the specific surface area per unit volume is large and the strength stably maintaining the honeycomb shape can be provided.

Furthermore, when the inorganic reinforcing agent is added, a higher strength can be provided and a honeycomb structural body having a large specific surface area per unit volume can be obtained.

In the invention, therefore, as a preferable example of the honeycomb structural body, it is preferable to produce the honeycomb unit by using the ceramic particles having a high specific surface area and the inorganic binder. Because, the catalyst component can be widely dispersed and carried over the honeycomb structural body, and it is possible to stably maintain the shape even if the ceramic particles are not sufficiently sintered or even under a condition easily subjected to the thermal shock or vibration (for example, in case of using at a state of mounting onto vehicles).

The inorganic material of the first embodiment used in the production of the high specific surface area honeycomb unit is an inorganic material (high specific surface particles) having a given aspect ratio (long side/short side), and as the inorganic material of the second embodiment is used an inorganic material having an aspect ratio (approximately 2 to 1000) larger than the above aspect ratio. In case of compounding such a material, the strength of the honeycomb unit can be increased through the action of inorganic material of the second embodiment having a relatively large aspect ratio. In this case, the aspect ratio of the inorganic material in the second embodiment is preferable to be approximately 2 to 1000. When the aspect ratio of the inorganic material in the second embodiment is approximately 2 or more, the contribution to the increase of the strength in the honeycomb structural body is large. While, when it is approximately 1000 or less, the clogging hardly occurs in a mold at the shaping not to deteriorate the shapability, and the inorganic material hardly breaks in the shaping such as extrusion molding or the like, so that the dispersion in the length is hardly generated to contribute to the improvement of the strength in the honeycomb structural body. Moreover, the aspect ratio is preferably approximately 5 to 800, more preferably approximately 10 to 500.

In the invention, the inorganic material of the first embodiment may be ceramic particles having a high specific surface area, and the inorganic material of the second embodiment may be inorganic fibers. In such a composition, the strength of the honeycomb unit is further increased through the addition of the inorganic fibers.

Also, the inorganic material of the first embodiment may be ceramic particles having a given particle size, and the inorganic material of the second embodiment may be ceramic particles having a particle size larger than that of the inorganic material of the first embodiment. In such a construction, the strength of the honeycomb unit is improved through the ceramic particles having a larger particle size.

In this case, the inorganic material of the second embodiment is preferable to have a particle size larger by approximately 5 or more times than that of the inorganic material of the first embodiment, more preferably approximately 10 to 30 times. Also, the ceramic particles as the inorganic material of the second embodiment are preferable to have a particle size of approximately 10 to 60 µm, more preferably approximately 20 to 50 µm. When the particle size is approximately 10 µm or more, the strength of the honeycomb structural body can be sufficiently increased, and when it is approximately 60 µm or less, the clogging hardly occurs in the mold at the shaping not to deteriorate the shapability.

When the particle size of the inorganic material of the first embodiment or the inorganic material of the second embodiment has a distribution, the average value thereof may be used. Also, the ceramic particles for the inorganic material of the second embodiment may be selected from a different kind of the ceramic particles for the inorganic material of the first embodiment, or the same kind of the ceramic particles for the inorganic material of the first embodiment having a different shape (particle shape) or different properties (e.g., particles having a different crystal form and melting temperature).

Further, when ceramic particles are used as the inorganic material of the second embodiment, the strength of the honeycomb structural body can be increased by the magnification of the particle size, so that the aspect ratio may be the same as that of the inorganic material of the first embodiment.

When ceramic particles having a large specific surface area are used as the inorganic material of the first embodiment, there may be used, for example, one or more particles selected from alumina, silica, zirconia, titania, ceria, mulite and zeolite, and among them, alumina is particularly preferable.

As the inorganic material of the second embodiment may be used, for example, nitride ceramics such as aluminum nitride, silicon nitride, boron nitride, titanium nitride and the like; carbide ceramics such as silicon carbide, zirconium carbide, titanium carbide, tantalum carbide, tungsten carbide and the like; and oxide ceramic such as -alumina, zirconia, cordierite, mulite, zeolite and the like.

When inorganic fibers are used as the inorganic material, there may be used, for example, ceramic fibers made of alumina, silica, silica-alumina, glass, potassium titanate, aluminum borate and the like; and whiskers made of alumina, silica, zirconia, titania, ceria, mulite, silicon carbide and the like as the inorganic fiber. They can be used alone or in a combination of two or more. Among the inorganic fibers, alumina fiber is desirable.

The amount of the inorganic material of the first embodiment (ceramic particles and the like) compounded is approximately 30 to 97 mass %. When the amount in the first embodiment is approximately 30 mass % or more, the specific surface area as the honeycomb structural body becomes large and the dispersibility of the catalyst component can be easily enhanced in the carrying of the catalyst component. And, when the amount is approximately 97 mass % or less, the amount of the inorganic material of the second embodiment (inorganic fibers and the like) compounded for contributing to the increase of the strength becomes large, and hence the strength of the honeycomb structural body increases. Moreover, the amount is preferably approximately 30 to 90 mass %, more preferably approximately 40 to 80 mass %, further preferably approximately 50 to 75 mass %.

The amount of the inorganic material of the second embodiment (inorganic fibers, whisker and the like) compounded is approximately 3 to 70 mass %. When the amount of the. inorganic material of the second embodiment is approximately 3 mass % or more, the strength of the honeycomb structural body does not decrease, and when it is approximately 70 mass % or less, the amount of the inorganic material of the first embodiment (ceramic particles and the like) compounded for contributing to the increase of the specific surface area becomes relatively large, and hence the specific surface area as the honeycomb structural body becomes large and the dispersibility of the catalyst component can be easily increased in the carrying of the catalyst component. Moreover, the amount is preferably approximately 3 to 50 mass %, more preferably approximately 5 to 40 mass %, further preferably approximately 8 to 30 mass %.

When an inorganic binder is used in the production of the high specific surface area honeycomb unit, it is effective to provide a sufficient strength even if the firing temperature of the honeycomb unit is lowered. As the inorganic binder may be used, for example, an inorganic sol, a clay-based binder and the like. Among them, as the inorganic sol may be used, for example, one or more inorganic sols selected from alumina sol, silica sol, titania sol, water glass and the like. As the clay-based binder may be used, for example, one or more clay-based binders selected from white clay, kaolin, montmorillonite, multi-chain structural clay (sepiolite, attapulgite) and the like.

The amount of the inorganic binder as a solid content compounded in the honeycomb structural body is approximately 50 parts by mass or less, preferably approximately 5 to 50 parts by mass, more preferably approximately 10 to 40 parts by mass, further preferably approximately 15 to 35 parts by mass, based on 100 parts by mass of the total amount of the inorganic material of the first embodiment and the inorganic material of the second embodiment. When the content of the inorganic binder is approximately 50 parts by mass or less, the formability increases.

An example of the production method of the honeycomb structural body according to the invention will be described below. Firstly, a starting paste mainly composed of the above materials (the inorganic material of the first embodiment, the inorganic material of the second embodiment, the inorganic binder and the like) is extrusion-molded to form a green shaped body of a honeycomb unit. Besides, an organic binder, a dispersion medium and a shaping assistance may be properly added to the starting paste. As the organic binder may be used, for example, one or more organic binders selected from methylcellulose, carboxymethyl cellulose, hydroxyethyl cellulose, polyethylene glycol, phenolic resin and epoxy resin. The amount of the organic binder compounded is preferably approximately 1 to 10 parts by mass based on 100 parts by mass of the total amount of the inorganic material of the first embodiment, the inorganic material of the second embodiment and the inorganic binder. As the dispersion medium may be used, for example, water, organic solvent (benzene or the like), alcohol and so on. As the shaping assistance may be used, for example, ethylene glycol, dextrin, aliphatic acid, aliphatic acid soap, polyvinyl alcohol and the like.

It is preferable to well mix and knead the starting paste. For example, it may be mixed by using a mixer or an attritor, or sufficiently kneaded by means of a kneader or the like. As the method for coating and forming the starting paste on the surface of the substrate, it is preferable to shape into a form having through-holes, for example, by means of the extrusion molding.

Next, the resulting green shaped body is dried. As a drying machine used for the drying may be used, for example, a microwave drying machine, a hot-air drying machine, a dielectric drying machine, a reduced-pressure drying machine, a vacuum drying machine, a freeze drying machine and the like. Then, the dried green shaped body is subjected to the degreasing. The condition for the degreasing is properly adjusted according to the kind or amount of the organic matter contained in the green shaped body, but a condition of, for example, approximately 400° C.×approximately 2 hours is preferable.

Next, the dried and degreased shaped body is fired. The firing is conducted, for example, at a temperature of approximately 600 to 1200° C., but the temperature of approximately 1000° C. or less is preferable. When the firing temperature is approximately 600° C. or more, the ceramic particles and the like are sufficiently sintered and the strength as a honeycomb structural body does not decrease. On the other hand, when it is approximately 1200° C. or less, the ceramic particles are not excessively sintered to make the specific surface area per unit volume large and the catalyst component carried thereon can be easily dispersed.

Then, a sealing material paste forming a sealing material layer is applied onto the surface of the obtained honeycomb unit to form the sealing material layer, whereby the honeycomb units are sequentially bonded with each other and then dried to form a joint body (block) of the honeycomb units having a given size. As the sealing material may be used, for example, a mixture of an inorganic binder and ceramic particles, a mixture of an inorganic binder and inorganic fibers, a mixture of an inorganic binder, ceramic particles, and inorganic fibers and the like. To the sealing material may be added an organic binder.

As the organic binder may be used, for example, one or more organic binders selected from polyvinyl alcohol, methylcellulose, ethylcellulose, carboxycellulose and the like.

As the inorganic binder may be used, for example, silica sol, alumina sol and the like. They may be used alone or in a combination of two or more. Among the inorganic binders, silica sol is desirable.

As the inorganic fibers may be used, for example, ceramic fibers of as silica-alumina, mulite, alumina, silica and the like. They may be used alone or in a combination of two or more. Among the inorganic fibers, silica-alumina fiber is desirable.

As the inorganic particles may be used, for example, oxides, carbides, nitrides and the like.

In the invention, the sealing material may be added with particles of alumina, zirconia, silica or the like having a high specific surface area in order to make the sealing material layer has a higher specific surface area. Also, inorganic particles made of silicon carbide, silicon nitride, boron nitride or the like or a whisker may be used. They can be used alone or in a combination of two or more. Among the inorganic particles, carbide or nitride particles are preferable in order to improve the thermal conductivity.

The sealing material layer 23 formed for bonding the honeycomb units with each other is preferable to have a thickness of approximately 0.5 to 2 mm. When the thickness is approximately 0.5 mm or more, a sufficient bonding strength can be obtained. While, when the thickness of the sealing material 23 layer is 2 mm or less, it has a portion not functioning for converting of an exhaust gas, so that the specific surface area per unit volume of the honeycomb structural body does not lower and the catalyst component can be sufficiently dispersed. Also, when the thickness of the sealing material layer is approximately 2 mm or less, the pressure loss is hardly increased.

It is preferable that the number of the bonding honeycomb units is properly determined in accordance with the size of the honeycomb structural body. Also, the joint body (block) formed by bonding the porous honeycomb units through the sealing material can be properly cut and polished in accordance with the size of the honeycomb structural body.

Onto the outer peripheral portion of the honeycomb structural body or the side surface thereof not opening the through-holes may be applied a sealing material, which may be dried to form a sealing material layer (coating material layer) 24 for the purpose of the gas sealing. The coating material layer 24 is preferable for protecting the outer peripheral portion of the unit and increasing its strength. In this case, the sealing material is not particularly limited, but may be made of the same material as the above sealing material (adhesive) or a different material. The coating material may have the same compounding ratio as in the sealing material layer or a different compounding ratio. The thickness of the coating material layer is preferable to be approximately 0.1 to 2 mm. When the thickness is approximately 0.1 mm or more, the protection of the outer peripheral surface becomes sufficient and the strength can be enhanced. While, when it is approximately 2 mm or less, the specific surface area per unit volume as a honeycomb structural body does not decease and the dispersibility in the carrying of the catalyst component can be easily improved.

After a plurality of honeycomb units are bonded through the sealing material (provided that if a sealing material layer (coating material layer) is formed on the outer peripheral portion, after the formation of the coating material layer), the calcination is conducted. The calcination is to degrease organic binders included in the sealing material and coating material. The calcination is preferably conducted under a condition of :approximately 700° C.×approximately 2 hours though the condition varies according to the kind or amount of the included organic matter. The honeycomb structural body after the calcination does not discharge the contaminated exhaust gas in use because the residual organic binder in the honeycomb structural body is burnt and removed.

Moreover, when the honeycomb structural body is prepared by previously shaping the honeycomb units into a fan form or a square shape and bonding them, it is possible to omit the cutting and polishing steps of the honeycomb block necessary for arranging the outer peripheral shape.

Figure 2:
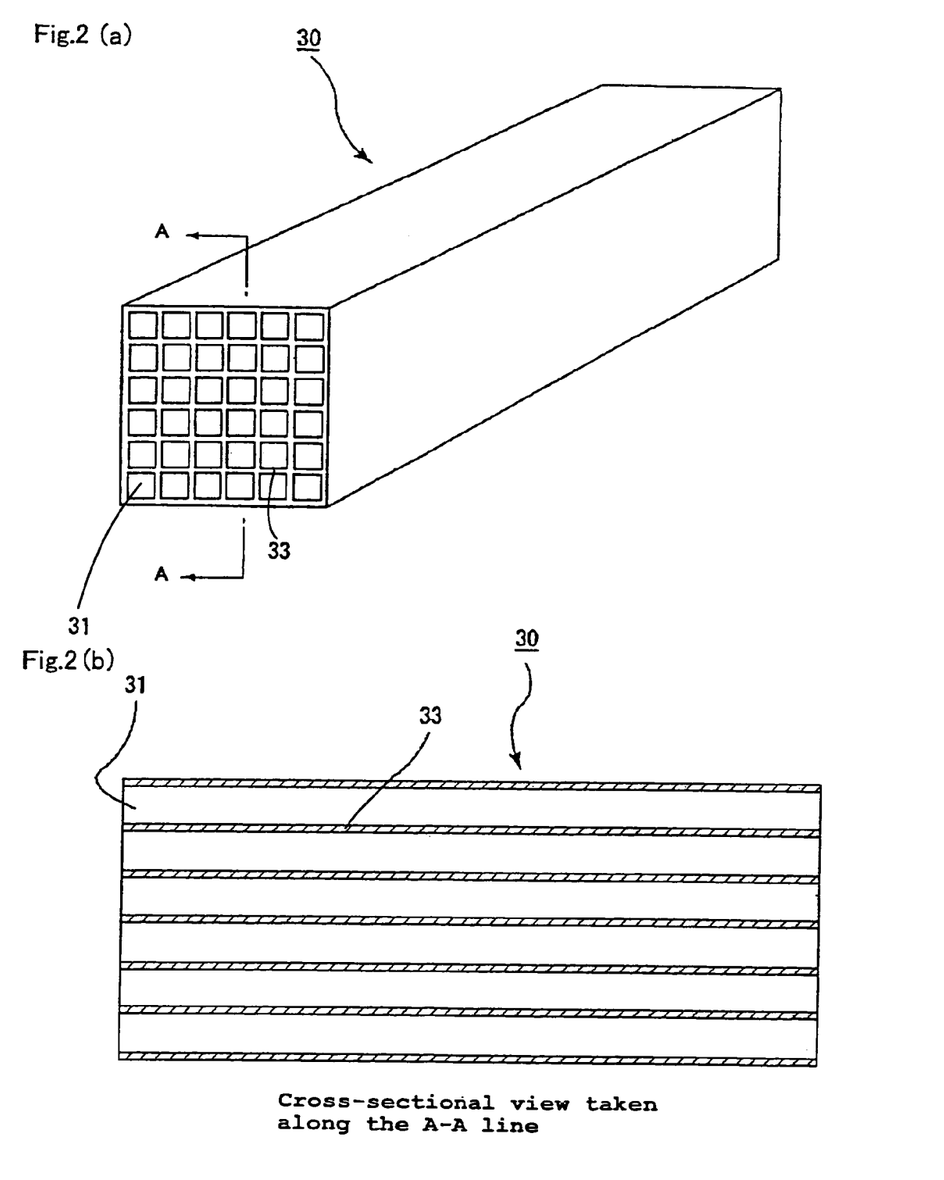
FIG. 2 is a perspective view of a honeycomb unit.
Figure 3:
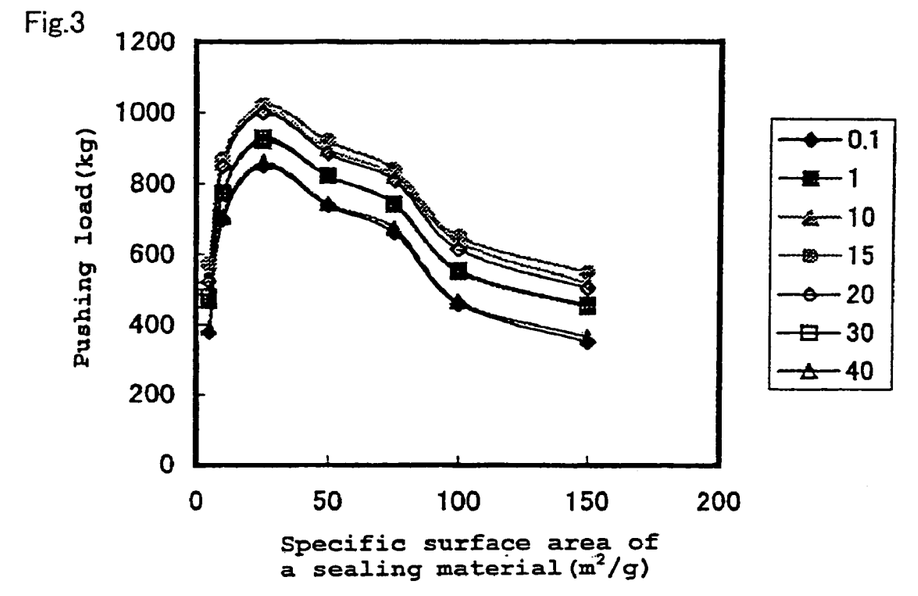
FIG. 3 is a graph showing a relation between a specific surface area of a sealing material and a pushing load.

The honeycomb structural body shown in FIGS. 1-2 is an example of the invention, but the invention is not limited only thereto. The illustrated reference number 1 is a cell wall. The thickness (wall thickness) of the cell wall 33 is not particularly limited, but is preferably approximately 0.05 to 0.35 mm. When the wall thickness is approximately 0.05 mm or more, the strength of the porous honeycomb unit does not decrease, while when it is approximately 0.35 mm or less, the exhaust gas sufficiently penetrates into the interior of the wall and easily contacts with the catalyst carried in the interior of the wall, and hence the catalytic action increases. Moreover, the thickness of the cell wall is preferably approximately 0.10 to 0.30 mm, more preferably approximately 0.15 to 0.25 mm.

The number of the through-holes per unit cross sectional area is preferably approximately 15.5 to 186 holes/cm$^2$ (approximately 100 to 1200 cpsi). When the number of the though-holes is approximately 15.5 holes/cm$^2$ or more, the area of the wall contacting with the exhaust gas becomes large, while when it is approximately 186 holes/cm$^2$ or less, the pressure loss is not increased and the porous honeycomb unit can be easily produced. The number of the through-holes is preferably approximately 46.5 to 170.5 holes/cm$^2$ (approximately 300 to 1100 cpsi), more preferably approximately 62.0 to 155 holes/cm$^2$ (approximately 400 to 1000 cpsi).

The cross sectional shape of the cell formed on the honeycomb unit (hereinafter referred to as "cell cross section") is preferably polygonal, for example, triangle, quadrilateral (square), rectangular, trapezoidal, pentagonal, hexagonal, octagonal and the like, or may be of various polygons. For example, the cross section may be approximately triangle or hexagon. In this case, it is considered to enhance the strength of the porous honeycomb unit to increase the strength of the honeycomb structural body (e.g. isostatic strength or the like) without lowering the pressure loss, exhaust gas convertion capability and the like.

The honeycomb structural body according to the invention may be used in the form of a honeycomb catalyst obtained by carrying a catalyst component in the cell walls (on the surfaces of the particles) or on the surfaces of the cell walls. As the catalyst component may be used, for example, a noble metal, an alkali metal compound, an alkaline earth metal compound, an oxide and the like. As the noble metal may be used one or more selected from platinum, palladium, and rhodium. As the alkali metal compound may be used, for example, one or more compounds selected from potassium, sodium and the like. As the alkaline earth metal compound may be used, for example, a compound of barium or the like. As the oxide may be used perovskite ($La_{0.75}K_{0.25}MnO_3$), $CeO_2$ or the like.

Such a honeycomb catalyst can be used, for example, as a so-called three-way catalyst, or NOx absorption catalyst for the convertion of the exhaust gas discharged from automobiles. Moreover, the catalyst component may be carried on the surfaces of the cell walls after the production of the honeycomb structural body, or on the surface of the each ceramic particle as the starting material in the production of the honeycomb units. The carrying of the catalyst component can be conducted, for example, by the impregnation method or the like.

EXAMPLES

The following examples will explain examples (honeycomb structural bodies according to the invention) produced under various conditions and comparative examples. However, the invention is not limited only to these examples.

Moreover, the tests hereinafter described are conducted in order to confirm the functions and effects when a plurality of the sealing material layers 23 and 24 prepared by varying the specific surface area are produced and the sealing material layers are formed on the outer surfaces of the honeycomb units made of alumina having various surface roughnesses and high specific surface areas.

(Production of Sealing Material Paste)

In Table 1 are shown the production condition of the sealing material pastes 1 to 7 used.

For example, a paste for a heat-resistant sealing material is prepared by mixing 1 mass % of inorganic powder (γ-alumina particles), 10 mass % of inorganic fibers (silica-alumina fibers having an average fiber diameter of 10 μm and an average fiber length of 200 μm), 19 mass % of silica sol (solid content of 30 mass %), 5 mass % of carboxymethyl cellulose and 25 mass % of water, which is used as paste 1.

Similarly, 7 kinds of pastes are prepared by compounding the-staring powder, inorganic fibers, silica sol, carboxymethyl cellulose as shown in Table. 1.

TABLE 1

|  | Paste 1 | Paste 2 | Paste 3 | Paste 4 | Paste 5 | Paste 6 | Paste 7 |
|---|---|---|---|---|---|---|---|
| Inorganic particle: SiC (mass %), average particle size: 0.6 μm | 40 | 30 | 20 | 10 | 0 | 0 | 20 |
| Inorganic particle: γ-alumina (mass %), average particle size: 0.5 μm | 1 | 3 | 10 | 20 | 30 | 40 | 0 |
| Silica alumina fiber (mass %), Fiber length: 200 μm Fiber diameter: 10 μm | 10 | 10 | 10 | 10 | 10 | 10 | 30 |
| Silica sol (mass %) Solid content: 30 mass % | 19 | 27 | 30 | 30 | 30 | 20 | 16 |
| Carboxymethyl cellulose (mass %) | 5 | 5 | 5 | 5 | 5 | 5 | 5.6 |
| Water (mass %) | 25 | 25 | 25 | 25 | 25 | 25 | 28.4 |
| BET specific surface area ($m^2/g$) | 10 | 25 | 50 | 75 | 100 | 150 | 5 |

(Production of a Fiber-Reinforced Alumina Honeycomb Unit)

A mixed composition is prepared by mixing 40 mass % of γ-alumina particles (average particle diameter of 2 μm), 10 mass % of silica-alumina fibers (average fiber diameter of 10 μm, average fiber length of 100 μm and aspect ratio of 10), 50 mass % of silica sol (solid content of 30 mass %), and adding 6 parts by mass of methylcellulose as an organic binder and small amounts of a plasticizer and a lubricant per 100 parts by mass of the resulting mixture and further mixing and kneading them. Next, the mixed composition is extrusion-molded by means of an extruder to obtain a green shaped body for honeycomb unit.

Then, the green shaped body. is sufficiently dried by using a microwave drying machine and a hot-air drying machine and degreased by holding at 400° C. for 2 hours. Thereafter, it is fired by holding at 800° C. for 2 hours to obtain a sample of a honeycomb unit made of porous alumina having a square pillar shape (34.3 mm×34.3 mm×150 mm), a cell density of 93 cells/$cm^2$ (600 cpsi) and a square (quadrilateral) cell form.

(Production of Honeycomb Structural Body)

Next, the outer surface of the honeycomb unit is subjected to a sandblast treatment by varying a particle size of an abrasives to obtain samples of honeycomb units having surface roughnesses Ra=0.5 μm, 1.0 μm, 5.0 μm, 15 μm, 20 μm, 30 μm and 40 μm. The surface roughness Ra is measured by scanning a measuring head along the cell on each central portion of the outer surface (4 surface) of the sample (honeycomb unit) by means of a surface roughness measuring machine (Surfcomb 920A, made by Tokyo Seimitsu Co., Ltd.) so as to match values with each other in the 4 outer surfaces of the honeycomb unit.

Then, there are provided 16 units of each sample. The samples of an equal level are adhered and united to each other by drying at 150° C. for 2 hours and heat-treating at 500° C. with the above sealing material paste and thereafter cut by means of a diamond cutter to obtain a cylindrical-shaped ceramic block (aggregate type honeycomb structural body).

In this case, the thickness of the sealing material layer is 2 mm. Further, the same sealing material paste is applied onto the outer peripheral portion of the ceramic block to form a sealing material layer (coating material layer) having a thickness of 2 mm to thereby to produce a honeycomb filter (diameters of 144 mm and 150 mm) for the convertion of the exhaust gas.

(Evaluation)

(1) Measurement of Specific Surface Area

In the measurement of BET specific surface area ($m^2/g$) of the sealing material, a test sample is prepared and used by subjecting each of the sealing material paste to a heat treatment under the same conditions as in the honeycomb structural body to form a sealing material solidified to a cube 15 mm on a side.

Next, the specific surface area is measured by a one-point method of the test sample using a BET measuring device (Micromeritics Flowsoap II-2300, made by Shimadzu Corporation) according to JIS-R-1626 (1996) prescribed by the Japanese Industrial standards. The results are shown on Table 1.

(2) Thermal Shock Test (Outer Peripheral Portion of Sealing Material Layer)

The thermal shock test is conducted by placing each sample of the honeycomb structural bodies in an electrical furnace and heating at a temperature rising rate of 5° C./min and holding at 700° C. for 30 minutes and slowly cooling to room temperature (20° C.). The results are shown in Table 2.

TABLE 2

<outer peripheral crack>

| Surface roughness Ra of honeycomb unit (μm) | Specific surface area of sealing material layer ($m^2/g$) | | | | | | |
|---|---|---|---|---|---|---|---|
|  | 5 | 10 | 25 | 50 | 75 | 100 | 150 |
| 0.1 | crack | no crack | no crack | no crack | no crack | no crack | crack |
| 1 | crack | no crack | no crack | no crack | no crack | no crack | crack |
| 10 | crack | no crack | no crack | no crack | no crack | no crack | crack |
| 15 | crack | no crack | no crack | no crack | no crack | no crack | crack |
| 20 | crack | no crack | no crack | no crack | no crack | no crack | crack |
| 30 | crack | no crack | no crack | no crack | no crack | no crack | crack |
| 40 | crack | no crack | no crack | no crack | no crack | no crack | crack |
| Presence or absence of cracks | | | | | | | |

(3) Thermal Shock Test (Joint Portion of Sealing Material Layer)

The test for resistance to thermal shock is carried out by placing each sample of the honeycomb structural bodies in an electric furnace and variously changing the temperature rising rate and holding at 900° C. for 20 hours and slowly cooling to room temperature (20° C.).

Figure 4:
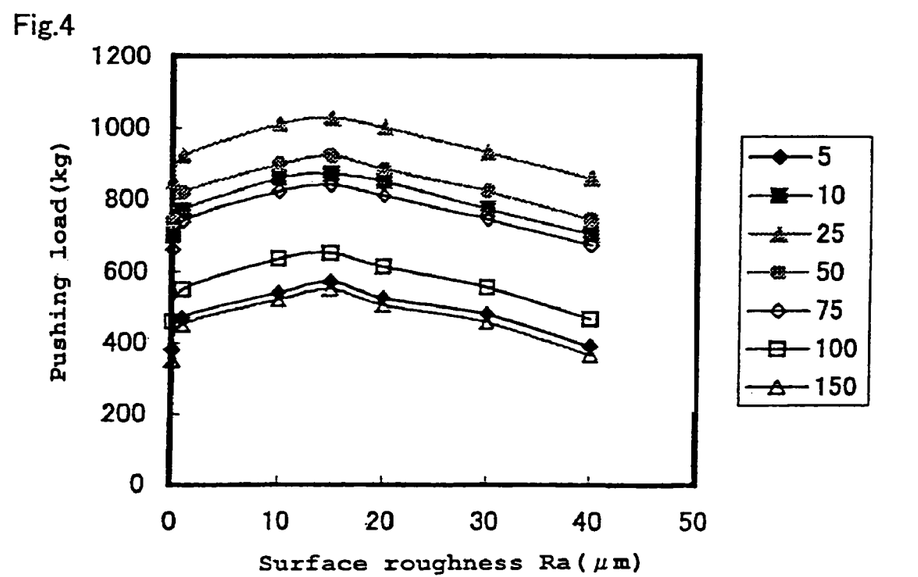
FIG. 4 is a graph showing the relation between a surface roughness Ra of a honeycomb unit and a pushing load.

After the above test for resistance to thermal shock, each of the honeycomb structural bodies is located in a hollow cylindrical jig. Thereafter, one honeycomb filter is selected form the approximately central portion of the honeycomb structural body and a pressure is applied of the honeycomb filter through a cylindrical stainless jig of 31 mm in diameter to measure a breaking load (adhesion strength) as a pushing load (breaking load) of the joint portion of the sealing material layer after the thermal shock. The results are shown in Table 3. Also, the relation between the specific surface area and the pushing load in the sealing material is shown in FIG. 4. Further, the relation between the surface roughness of the honeycomb unit and the pushing load is shown in FIG. 5.

TABLE 3

<pushing load>

| Surface roughness Ra of honeycomb unit (μm) | Specific surface area of sealing material layer (m²/g) | | | | | | |
|---|---|---|---|---|---|---|---|
| | 5 | 10 | 25 | 50 | 75 | 100 | 150 |
| 0.1 | 380 | 700 | 850 | 738 | 660 | 460 | 350 |
| 1 | 470 | 770 | 920 | 820 | 740 | 550 | 450 |
| 10 | 540 | 860 | 1010 | 898 | 823 | 635 | 520 |
| 15 | 570 | 870 | 1025 | 920 | 840 | 650 | 550 |
| 20 | 524 | 850 | 1000 | 885 | 810 | 613 | 505 |
| 30 | 480 | 774 | 930 | 823 | 744 | 555 | 458 |
| 40 | 390 | 705 | 860 | 745 | 674 | 467 | 365 |

As seen from the results of Tables 2 and 3, when the specific surface area of the sealing material is 10 to 100 m²/g, no crack is caused in the sealing material layer formed on the outer peripheral portion of the honeycomb unit. In addition, the strength tends to be high, so that the sealeng property and adhesiveness are improved.

Further, it has been confirmed that when the surface roughness Ra of the outer surface in the honeycomb unit and the honeycomb monolith is 1 to 30 μm, the sealing property is further improved.

INDUSTRIAL APPLICABILITY

The honeycomb structural body according to the invention is used as an exhaust gas convertion apparatus in internal combustion engines but also as an apparatus or a filter for converting the exhaust gas eliminated from boilers, heating furnaces, gas turbines, various industrial processes and the like. Particularly, the invention is desirable to be utilized as a catalyst carrier for the convertion of the exhaust gas from vehicles or a diesel particulate filter (DPF) having a function filtering, firing and purifying particle materials (PM) included in the exhaust gas. Naturally, it can be utilized for applications not requiring to carry the catalyst component (e.g. an absorbent absorbing gas components or liquid components) and the like.

The invention claimed is:

1. A honeycomb structural body, comprising:
   a plurality of pillar-shaped porous ceramic members, each of the ceramic members formed by arranging a plurality of through-holes side by side through cell walls in the longitudinal direction of the ceramic member; and
   a sealing material layer interposed between the adjacent ceramic members, so that the plurality of porous ceramic members are bonded together,
   wherein the plurality of porous ceramic members and the sealing material layer interposed therebetween are subjected to calcinining, such that the resulting sealing material layer has a specific surface area of approximately 10 to 100 m²/g.

2. The honeycomb structural body according to claim 1, wherein a sealing material layer is provided on an outermost peripheral portion of a honeycomb block formed by bonding a plurality of the ceramic members.

3. The honeycomb structural body according to claim 1 or 2, wherein the surface of the ceramic member in contact with the sealing material layer has a surface roughness Ra of approximately 1.0 to 30 μm.

4. The honeycomb structural body according to claim 1, wherein the sealing material layer is an adhesive.

5. The honeycomb structural body according to claim 1 or 2, wherein the sealing material layer comprises an inorganic binder and at least one component chosen from inorganic particles and inorganic fibers.

6. The honeycomb structural body according to claim 1 or 2, wherein the ceramic member comprises alumina.

7. The honeycomb structural body according to claim 1 or 2, wherein it is used as an exhaust gas converting apparatus of vehicles.

8. The honeycomb structural body according to claim 1 or 2, wherein a cross sectional area of the ceramic member perpendicular to the longitudinal direction of the ceramic member is approximately 5-50 cm².

9. The honeycomb structural body according to claim 1 or 2, wherein a ratio of the sum of the cross sectional area of the ceramic members perpendicular to the longitudinal direction of the ceramic member to the cross sectional area of the honeycomb structural body perpendicular to the longitudinal direction of the ceramic member is approximately 85% or more.

10. The honeycomb structural body according to claim 1 or 2, wherein the porous ceramic member comprises inorganic material of a first embodiment and an inorganic material of a second embodiment.

11. The honeycomb structural body according to claim 10, wherein the inorganic material of the second embodiment has an aspect ratio of approximately 2 to 1000.

12. The honeycomb structural body according to claim 10, wherein the inorganic material of the second embodiment has a particle size approximately 5 or more times that of the inorganic material of the first embodiment.

13. The honeycomb structural body according to claim 10, wherein the amount of the inorganic material of the first embodiment compounded is approximately 30 to 97 mass %.

14. The honeycomb structural body according to claim 10, wherein the amount of the inorganic material of the second embodiment compounded is approximately 3 to 70 mass %.

15. The honeycomb structural body according to claim 10, further comprising an inorganic binder of approximately 50 parts by mass or less based on 100 parts by mass the total amount of the inorganic material of the first embodiment and the inorganic material of the second embodiment.

16. The honeycomb structural body according to claim 1, wherein the ceramic member is fired at a temperature of approximately 600 to 1200° C.

17. The honeycomb structural body according to claim 1, wherein the sealing material layer has a thickness of approximately 0.5 to 2 mm.

18. The honeycomb structural body according to claim 2, wherein the thickness of the sealing material layer provided on the outermost peripheral portion of the honeycomb block is approximately 0.1 to 2 mm.

19. The honeycomb structural body according to claim 1, wherein the cell wall has a thickness of approximately 0.05 to 0.35 mm.

20. The honeycomb structural body according to claim 1, wherein a number of the through-holes per unit cross sectional area is approximately 15.5 to 186 holes/cm$^2$.

21. A sealing material layer for a honeycomb structural body, said sealing material layer having a specific surface area of approximately 10 to 100 m$^2$/g after calcination, wherein said sealing material layer is interposed between two adjacent pillar-shaped porous ceramic members to bond the ceramic members together.

22. The sealing material layer for a honeycomb structural body according to claim 21, wherein each ceramic member is formed by arranging a plurality of through-holes side by side through cell walls the longitudinal direction of the ceramic member.

23. The sealing material layer for a honeycomb structural body according to claim 21, wherein it is used for coating the outer peripheral portion of a honeycomb block formed by binding together a plurality of pillar-shaped porous ceramic members, each ceramic member is formed by arranging a plurality of through-holes side by side through cell walls in the longitudinal direction of the ceramic member.

24. The sealing material layer according to claim 21, comprising an inorganic binder and at least one component chosen from inorganic particles and inorganic fibers.

25. The sealing material layer according to claim 21, said sealing material layer having a thickness approximately 0.5 to 2 mm.

26. The sealing material layer according to claim 23, wherein the thickness of the sealing material layer coated on the outermost peripheral portion of the honeycomb block is approximately 0.1 to 2 mm.

\* \* \* \* \*